United States Patent [19]

Leonard

[11] Patent Number: 4,832,660
[45] Date of Patent: May 23, 1989

[54] VARIABLE RATIO DRIVE MECHANISM

[76] Inventor: George H. Leonard, 327 Hollow Tree Ridge Rd., Darien, Conn. 06820

[21] Appl. No.: 217,480

[22] Filed: Jul. 11, 1988

[51] Int. Cl.$^4$ .............................................. F16H 11/00
[52] U.S. Cl. ......................................... 474/49; 474/56
[58] Field of Search .................... 474/49, 50, 52–57

[56] References Cited

U.S. PATENT DOCUMENTS

| | | | |
|---|---|---|---|
| 3,757,594 | 9/1973 | Kumm | 474/49 |
| 3,867,851 | 2/1975 | Gregory et al. | 474/56 |
| 3,956,944 | 5/1976 | Tompkins | 474/50 |
| 3,995,508 | 12/1976 | Newell | 474/56 X |
| 4,024,772 | 5/1977 | Kumm | 474/49 |
| 4,030,373 | 6/1977 | Leonard | 474/49 X |
| 4,295,836 | 10/1981 | Kumm | 474/51 |
| 4,591,351 | 5/1986 | Kumm | 474/49 |
| 4,696,662 | 9/1987 | Gummeringer | 474/49 |
| 4,714,452 | 12/1987 | Kumm et al. | 474/49 |

*Primary Examiner*—Thuy M. Bui
*Attorney, Agent, or Firm*—Perman & Green

[57] ABSTRACT

This invention relates to an apparatus for positioning a bearing surface relative to a track. The invention, in one embodiment, includes a rotatably mounted drive mechanism which is provided with a plurality of radially oriented tracks. The drive mechanism preferably comprises a pair of parallel drive disks with co-linear, radial tracks having tooth-like formations arranged therein. A movable sheave segment is mounted between each set of co-linear tracks. Each sheave segment comprises two pair of engagement blocks, one pair for each track and an independent multi-element cam lock. Tooth formations on the engagement blocks provide formations for locking each sheave segment into place in the toothed track. Each sheave segment's bearing surface is engaged by an endless belt when the drive mechanism traverses through a predetermined arc of rotation but is disengaged from the drive belt when outside the predetermined arc of rotation. The multi-element cam lock associated with each sheave segment is forced by belt pressure to rigidly bias a sheave segments' engagement blocks against the tooth-like formations in the track. Springs are also provided to resiliently bias the engagement blocks into engagement with the track's tooth-like formations so that the sheave segments are lightly held in place even when out of engagement with the drive belt.

15 Claims, 4 Drawing Sheets

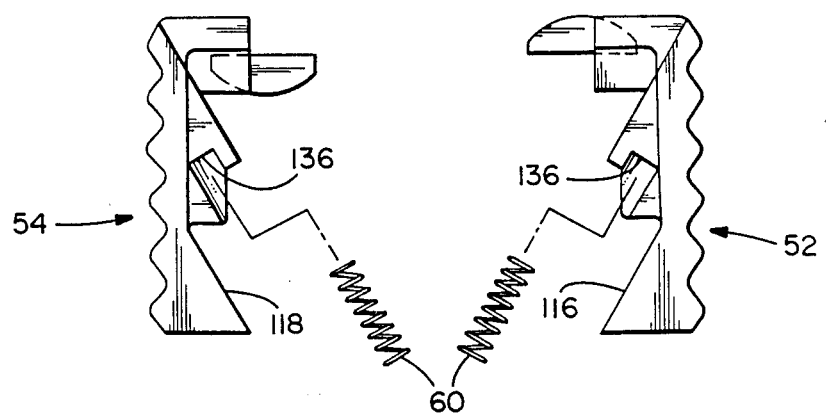
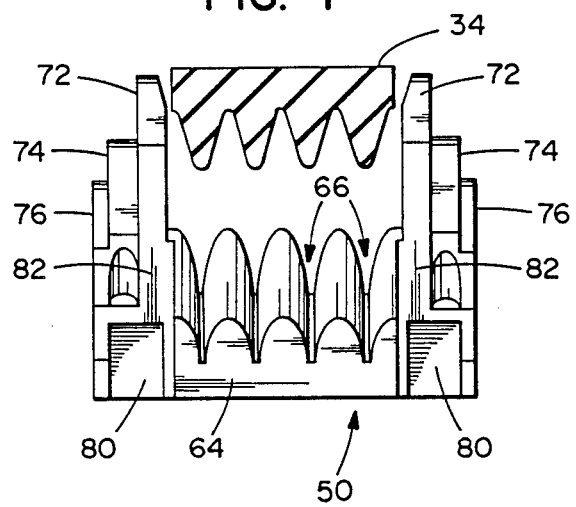

VARIABLE RATIO DRIVE MECHANISM

REFERENCE TO RELATED APPLICATION

This application is related to U.S. patent application Ser. No. 07/217,452, filed on even date herewith; assigned to the same assignee hereof and entitled Variable Ratio Drive Mechanism, to J. Lander.

FIELD OF THE INVENTION

This invention relates to variable ratio drive mechanisms and more particularly to an improved variable ratio drive mechanism particularly adapted for use with bicycles.

BACKGROUND OF THE INVENTION

Variable speed drives chains and sprockets have been employed with bicycles for many years. The drawbacks of such systems are well known and are described in U.S. Pat. No. 4,030,373 to the inventor hereof. Therein is disclosed a variable ratio transmission for bicycles which includes a plurality of movable sheave segments, each sheave segment having a releasable, toothed retaining means which normally retains the sheave segment at a fixed radial position in a toothed track.

That structure is, essentially, a variable diameter pulley or sheave whose diameter is adapted to be selectively adjusted by the rider. A flexible belt is wrapped around and engages different adjacent sheave segments to impart rotary motion to the drive mechanism. The relative position of each sheave segment in its toothed track is adjusted only when a sheave segment comes out of contact with the drive belt.

The mechanism described in the '373 patent for locking each sheave segment into place after adjustment contains relatively small and highly stressed parts requiring close manufacturing tolerances. The setting mechanism is sensitive to both axial location and warpage. Locking surety also degrades somewhat with wear.

In U.S. Pat. No. 4,503,676 to the inventor hereof, a variable ratio drive mechanism is disclosed which also employs driving and driven sheaves, each of which is provided with a set of adjustable sheave segments. In that mechanism, individual sheave segments are one-piece, belt-loaded-locked units which engage saw-tooth shaped steps along associated trackways. The center line of each sheave segment is offset from a radial line so that the belt's force on each sheave segment applies an offset torque which forces the sheave segment's teeth into engagement with opposed saw tooth steps along one side of the track. When each sheave segment become free of the belt's force, it can be engaged by a shifter which causes its teeth to move out of engagement with the track's steps. The sheave segment is then radially movable in either an outward or inward manner. In order to unlock the sheave segment's teeth from engagement, means are provided to cause a modest amount of rotation of a segment's teeth so that they can ratchet up or down relative to the track's steps. This design is not suitable for small sheave diameters and for applications involving relatively resilient belts which are subjected to grossly fluctuating driving tensions. Furthermore, the design is adapted only to a single direction drive.

In U.S. patent application Ser. No. 140,232, filed Dec. 31, 1987 and entitled "Variable-Ratio Transmissions, Separately and In Bicycles" to the inventor hereof, there is disclosed still another transmission of the type that includes sheave segments coupled together by a drive belt. That transmission employs a sheave segment locking mechanism which runs the full length of each disk track in the drive mechanism. The locking mechanism described therein is controlled by a fixed path cam whose action is unrelated to the radial position of the sheave. More specifically, the locking mechanism is released and removed from interaction with an individual sheave segment by a cam means which is operative only when the sheave segment is out of contact with the drive belt. Under those circumstances, the sheave segment is free floating and can be either moved inwardly or outwardly by a shift mechanism. In this mechanism, positive and consistent lock-up is dependent upon light springs and free fitting, cooperating parts. Relatively close tolerances are required and lock-up surety decreases with wear.

Accordingly, it is an object of this invention to provide an improved variable ratio drive mechanism of simple design.

It is a further object of this invention to provide an improved variable ratio drive mechanism which exhibits substantial resistance to wear and positive lock-up.

It is a still further object of this invention to provide an improved variable ratio drive mechanism which is insensitive to belt resiliency and automatically compensates for wear.

It is another object of this invention to provide an improved variable ratio drive mechanism which is adapted to bidirectional operation and requires only relatively relaxed manufacturing tolerances.

SUMMARY OF THE INVENTION

In accordance with the above objects, the invention hereof relates to an apparatus for positioning a bearing surface relative to a track. The invention, in one embodiment, includes a rotatably mounted drive mechanism which is provided with a plurality of radially oriented tracks. The drive mechanism preferably comprises a pair of parallel drive disks with co-linear, radial tracks having tooth-like formations arranged therein. A movable sheave segment is mounted between each set of co-linear tracks. Each sheave segment comprises two pair of engagement blocks, one pair for each track and an independent multi-element cam bearing means. Toothed means on the engagement blocks provide means for locking each sheave segment into place in the toothed track.

Each sheave segment's bearing surface is engaged by an endless belt when the drive mechanism traverses through a predetermined arc of rotation but is disengaged from the drive belt when outside the predetermined arc of rotation. The multi-element cam locking means associated with each sheave segment is forced by belt pressure to rigidly bias a sheave segment's engagement blocks against the tooth-like formations in the track. Spring means are also provided to resiliently bias the engagement blocks into engagement with the track's tooth-like formations so that the sheave segments are lightly held in place even when out of engagement with 15 the drive belt.

DESCRIPTION OF THE DRAWINGS

FIG. 4 is a side elevation showing the multi-element cam/bearing means with the drive belt somewhat removed.

FIG. 5 is a rear elevation showing the relationship between bias springs and their associated engagement blocks.

It should be noted that none of the above drawings are drawn to scale and that the segments and tracks are purposely drawn larger than the rest of the assembly to more clearly describe the invention.

DETAILED DESCRIPTION OF THE INVENTION

U.S. Pat. Nos. 4,030,373, 4,530,676 and U.S. patent application Ser. No. 140,232, all to the inventor hereof, each describe variable ratio transmissions which are usable with both bicycles and other apparatus. The disclosures of those patents and application are expressly incorporated herein by reference. The variable speed drive mechanism to be described below is particularly adapted for inclusion with the transmission described in the aforementioned patent application Ser. No. 140,232—with appropriate modifications being made thereto to accommodate this invention. For instance, the following structural changes to the transmission shown in the aforementioned application would be necessary: the slot geometry has been altered and affects the structure of disks 82, 84, 110 and 112 (see FIGS. 13 and 19); the radial camming structure is eliminated, i.e., parts 95, 96, 97 and 146 (see FIGS. 13, 15 and 18); the segment design has been changed (see 46 and 48 in FIGS. 7 and 13); and the locking method changed (parts 90 and 94 eliminated in FIG. 13).

Although the invention disclosed herein is described for use in a bicycle transmission, it is to be understood that it may be used in many other applications. In general, its application is for repositioning a bearing surface relative to a track.

Figure 1:
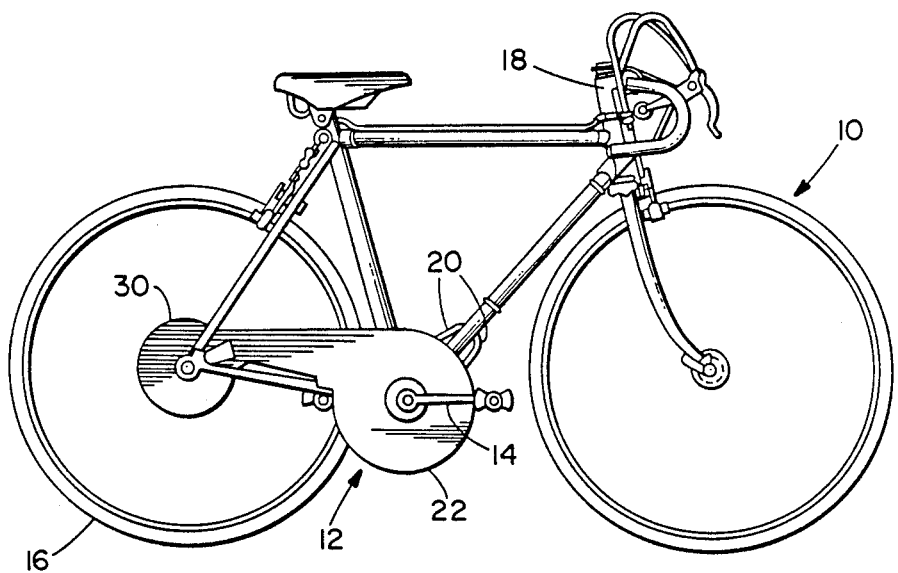
FIG. 1 is a right elevation of a typical bicycle equipped with a variable ratio drive mechanism embodying the invention.

Referring now to FIG. 1, a bicycle 10, of the commonly accepted form, is shown and includes an adjustable ratio transmission 12. Transmission 12 provides the drive coupling between pedal crank 14 and rear wheel 16. A manual transmission ratio control 18 includes a pivoted finger actuated member that is conveniently operable by the person riding the bicycle. Ratio control 18 enables the rider to control transmission 12 via cable means 20. The details of shift control 18 are disclosed in copending U.S. patent application Ser. No. 140,232 and will not be further described herein. Suffice to say that the movement of shift control 18 one way or the other has the effect of conditioning transmission 12 to change its ratio in progressive steps using force exerted by pedal crank 14. So long as shift control 18 remains off center, continued operation of the pedal crank 14 will cause, within design limitations, continuous step by step change in the transmission's ratio.

Figure 2:
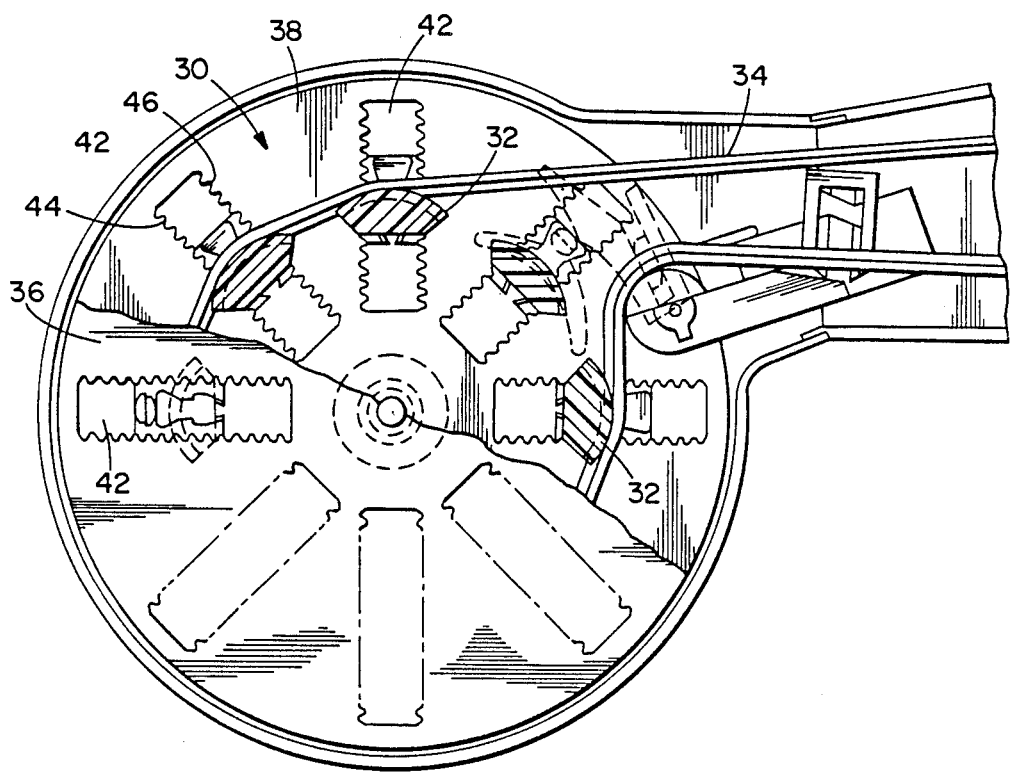
FIG. 2 is a right elevation of the rear wheel portion of variable ratio drive mechanism embodying the invention, a portion of which elevation has been broken away to show the internal arrangement of the sheave segments.

Referring to both FIGS. 1 and 2, transmission unit 12 includes similar front and rear drive mechanisms, both of which include adjustable diameter sheaves. The front drive mechanism includes an adjustable sheave means (not shown) within housing 22 that is coaxial with and operated by pedal crank 14. Transmission unit 30 further includes a rear drive mechanism 30 (see also FIG. 2) which comprises a variable diameter pulley or sheave and includes a plurality of radially adjustable sheave segments 32. An endless member or belt 34 may be in driving or driven frictional contact with each of sheave segments 32. When a selected transmission ratio is in effect, the sheave segments on both the front and rear sheaves of bicycle 10 are locked at a fixed radius so as to enable the creation of the desired transmission ratio.

Figure 3:
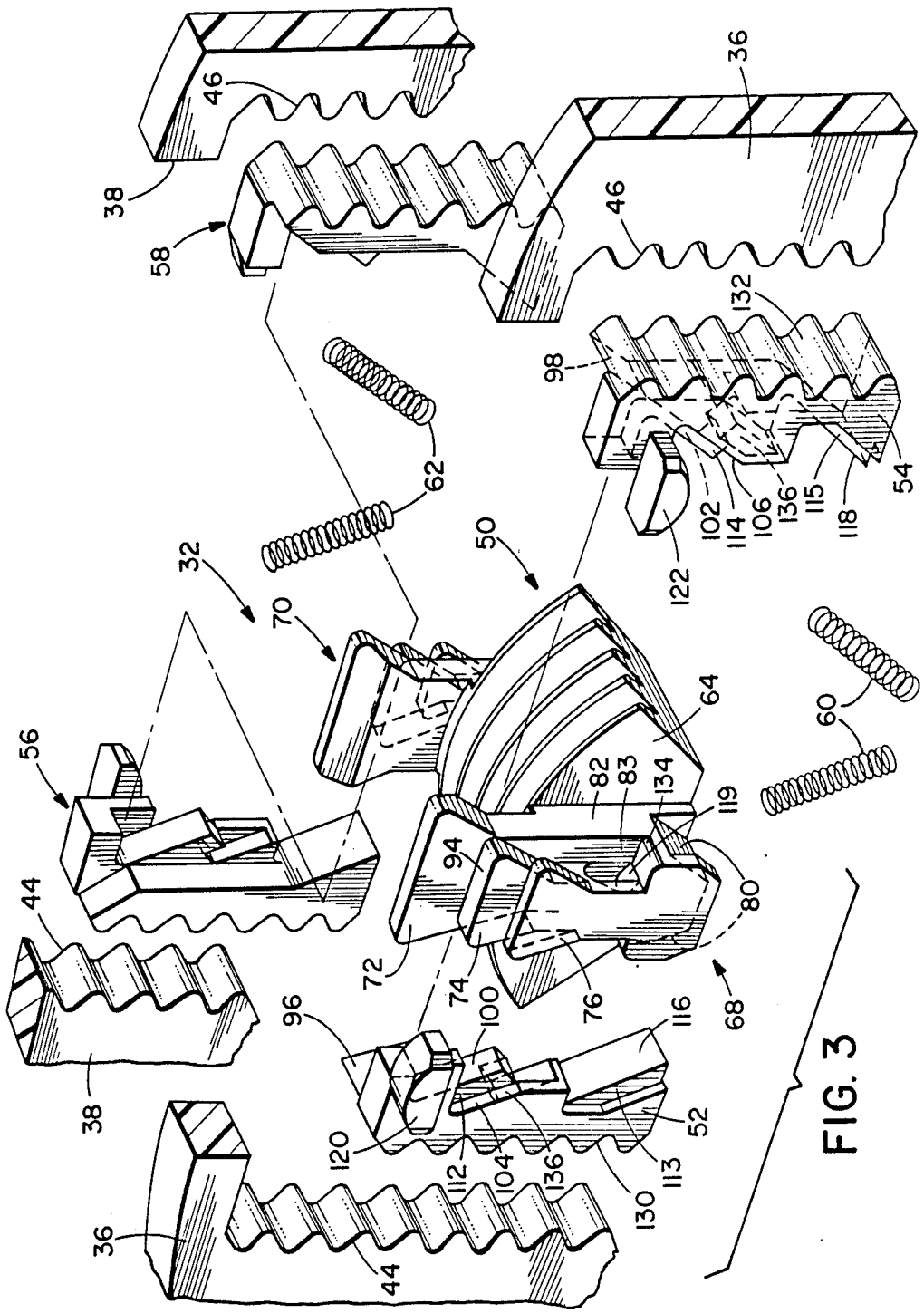
FIG. 3 is a fragmentary exploded perspective of a sheave segment shown in FIG. 2.

Referring the FIGS. 2 and 3, drive mechanism 30 is further comprised of two, coaxially spaced-apart, disks 36 and 38 which form a unitary rotatable member coupled to a clutch and supported by roller bearings (not shown). Each of disks 36 and 38 is provided with a plurality of extended, toothed slots 42, which are radially and co-linearly aligned on disks 36 and 38, respectively.

Each of slots 42 has formed therein, on opposing surfaces thereof, tooth-like formations such as teeth 44 and 46, respectively. Teeth 44 and 46 have rounded crowns to enable each of sheave segments 32 which interlock therewith, to move either in a radially inward or outward direction with equal ease. In FIG. 2, each of sheave segments 32, which are shown in the area where disk 36 has been cut away, have had their outer engagement blocks removed. This structure will be better understood by referring to FIG. 3 wherein there is shown an exploded view of a complete sheave segment and its associated tracks.

Each sheave segment 32 comprises five main components: a multi-element cam/bearing means 50, a right-rear engagement block 52, a right-forward engagement block 54, a left-rear engagement block 56 and a left-forward engagement block 58. In addition, two pairs of bias coil springs 60 and 62 are further provided and will be discussed below.

As shown in FIG. 4, multi-element cam/bearing means 50 includes a grooved cap 64 adapted to receive an endless multi-V drive belt 34. Each of grooves 66 is adapted to mate with a V-section of drive belt 34; however each groove 66 is dimensioned so that its sides pinch the V-sections of drive belt 34 as it passes therethrough.

Referring back to FIG. 3, on either side of cap 64 there is a multi-wedge cam 68 and 70, each of which includes a plurality of wedge cams 72, 74 and 76. The bottommost portion of each multi-wedge cam 68 and 70 includes surfaces 80 which also serve as additional wedge cams. Wedge cam 72 is an extension of the upper portion of body 82, whereas wedge cam 74 depends from surface 83 of body 82, and wedge cam 76 depends from the outer surface of wedge cam 74.

Right-rear engagement block 52 and left-rear engagement block 56 are mirror images of each other as are right-forward engagement block 54 and left-forward engagement block 58 (with the exception of the nubbin arrangements). Hereinafter, only right engagement blocks 52 and 54 will be discussed; however, it should be understood that left engagement blocks 56 and 58 have similar relations to each other and to multi-element cam/bearing means 50 and operate in a substantially identical manner.

Each of engagement blocks 52 and 54 has a plurality of follower surfaces which slideably mate with various of the surfaces on multi-wedge cam 68. While engagement blocks 52 and 54 are shown in FIG. 3 as being removed from multi-wedge cam 68, under normal circumstances, they are juxtaposed to each other. Thus, when multi-element wedge cam 68 moves either up or down, its various wedges cam the follower surfaces of engagement blocks 52 and 54 so as to cause them to move either inwardly or outwardly, as the case may be.

More specifically, the oblique wedge cam 72 ride on inclined follower surfaces 96 and 98 of engagement blocks 52 and 54, respectively. The inclined surfaces on wedge cam 74 ride on follower surfaces 100 and 102 of engagement blocks 52 and 54, respectively. The inclined surfaces of wedge cam 76 interact with follower surfaces 104 and 106. The inward-looking surfaces of wedge cam 76 interact with outward-looking surfaces 112, 113, 114 and 115 to provide lateral stability for the assembly. Finally, the lower most wedge surfaces 80 of body 82 interact with follower surfaces 116 and 188 of engagement blocks 52 and 54, respectively.

When engagement blocks 52 and 54 are brought into juxtaposition with multi-wedge cam 68, upper nubbin portion 120 is caused to slide over lower nubbin portion 122. In addition, follower surfaces 100 and 102 (on engagement blocks 52 and 54) nest in the region between the inner surface of wedge cam 76 and front surface 83 of body 82. In a similar manner, follower surfaces 116 and 118 nest in the region behind wedge cam 78. It will be seen that this nesting action prevents any relative movement in a direction orthogonal to the faces of multi-element wedge cam 68.

When engagement blocks 52 and 54 are assembled with multi-element wedge cam 68, springs 60 are employed to bias the toothed surfaces 130 and 132 on engagement blocks 52 and 54 against toothed surfaces 44 and 46, respectively. The bottom-most portion of each spring 60, when in place, rests in a recess 119. Each spring 60 extends up and into an open sided well area 136 immediately behind follower surface 100. A similar well 136 exists on engagement block 54 behind cam surface 118. This is shown in detail in FIG. 5 wherein a rear view is taken of engagement blocks 54 and 56 and illustrates how spring 60 is nested when the engagement blocks are brought together. The diameter of each well area 136 is made slightly less than the diameter of spring 60 so as to provide an interference fit when the components are assembled.

Figure 6:
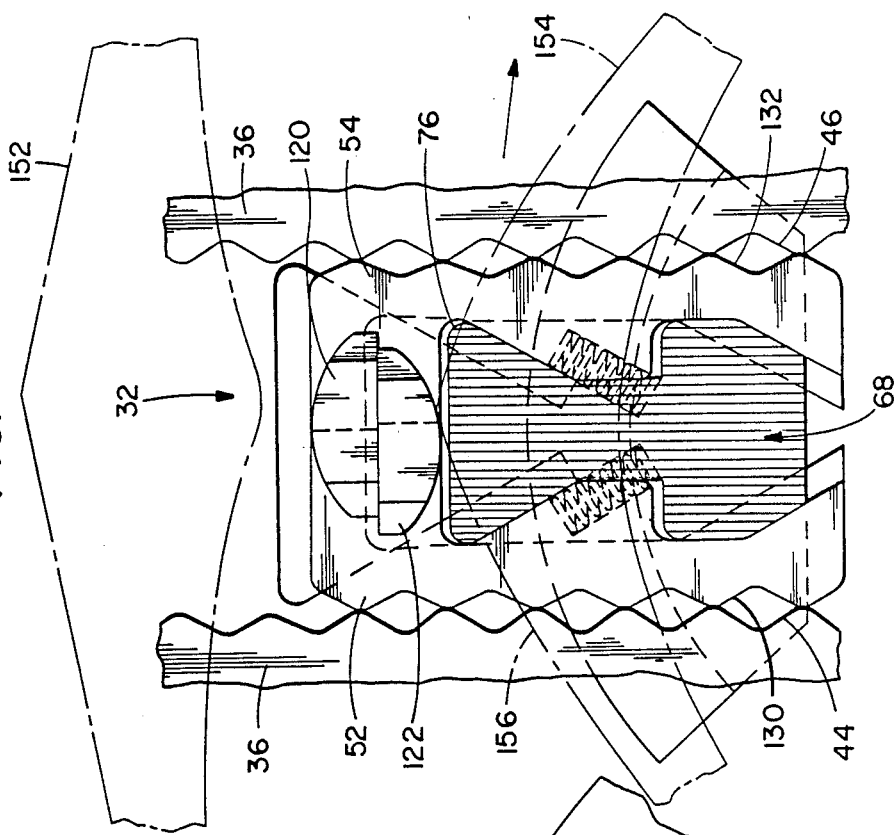
FIG. 6 is a side elevation of a sheave segment when engaged with the drive belt.
Figure 7:
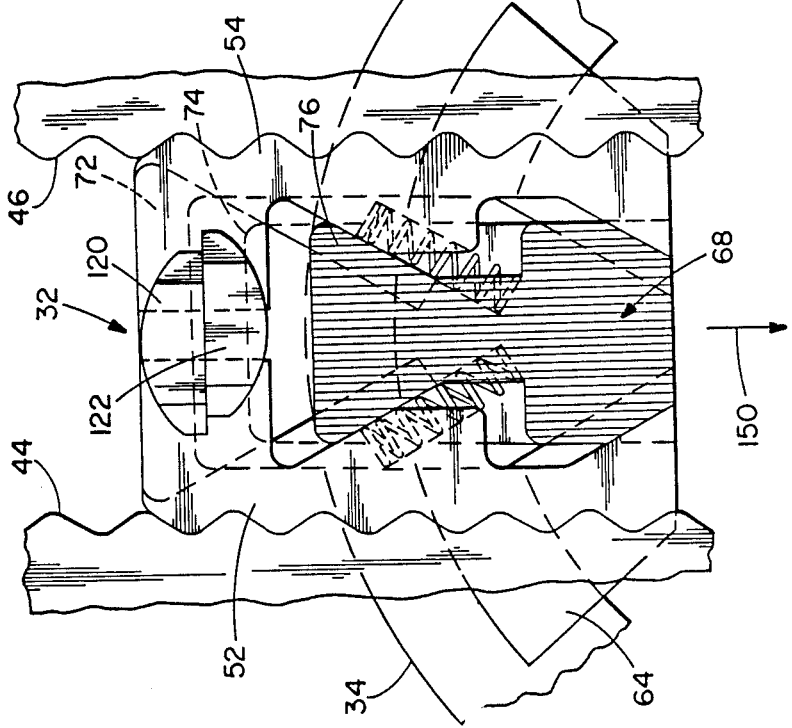
FIG. 7 is a side elevation of a sheave segment when being engaged by shift cams of the shift mechanism.

Referring now to FIGS. 6 and 7, the operation of a sheave segment will be described. As shown in FIG. 6, it is initially assumed that belt 34 overlays cap 64 and exerts a radially inward force thereon as indicated by arrow 150. As a result, the various wedge cams of multi-wedge cam 68 exert an outward pressure on engagement blocks 52 and 54. In FIGS. 6 and 7, the outermost surface of wedge cam 76 has been vertically cross-hatched to allow the viewer to distinguish it from the other elements of the drawings. Thus, it can be seen that each of wedge cams 72, 74 and 76 exert pressure on engagement blocks 52 and 54 and cause their respective teeth to interlock with the tooth-like formations on the track. So long as belt 34 continues to exert pressure, as indicated by arrow 150, engagement blocks 52 and 54 are not free to move. When, however, disk 36 rotates to a position where the sheave segment 32 is disengaged from belt 34, it is then adapted to be moved. However, until sheave segment 32 engages the shift structure, springs 60 maintain engagement blocks 52 and 54 pressed against tooth-like formations 44 and 46 and prevent centrifugal forces from moving the unloaded sheave segment in an outward direction.

In FIG. 7, belt 34 is no longer engaged with cap 64 and disk 36 has rotated so that sheave segment 32 is in the vicinity of shift cams 152 and 154. In this case, nubbin 122 is in contact with surface 156 of shift cam 154 and is thereby forced in a radially outward direction by the rotation of disk 36. The upward movement of nubbin 122 is imparted to nubbin 120 through their common interface, with the result being that both engagement blocks 52 and 54 (which are respectively connected to nubbins 120 and 122) are moved in a radially outward direction. As nubbin 122 rides up on surface 156, teeth 130 and 132 disengage from tooth-like formations 44 and 46 and springs 60 are compressed. When the apexes of the engaged teeth just pass each other, springs 60 expand rapidly and force a re-engagement of the respective toothed surfaces. This action thereby forces multi-element cam/bearing means 50 to also move upwardly, by a full tooth, impelled by a one-half tooth movement of the engagement blocks. The action continues until nubbin 122 no longer contacts gate cam 154 on subsequent rotations, whereby the engagement blocks are again seated as shown in FIG. 6.

A similar action occurs if gate cam 152 is lowered into engagement with nubbin 120 during its rotational movement. Nubbin 120 is thus caused to push against nubbin 122. Cam/bearing means 50 remains stationary in its radial location during the first one-half tooth inward travel of the engagement blocks, until the tooth apexes just pass each other, at which time it snaps one tooth inward. It should be understood that while the action of gate cams 152 and 154 have been described with respect to nubbins 120 and 122, an identical pair of gate cams are present on the opposite side of the drive disks and engage the nubbins attached to engagement blocks 56 and 58 (see FIG. 3). Thus, there is an equal and identically directed camming action exerted on both sides of the sheave segment at all times it is being acted upon by the shift mechanism.

The foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. In a variable ratio drive mechanism, the combination comprising:
    a rotatably mounted drive mechanism having a plurality of radially elongated tracks with tooth like formations therein;
    an endless drive member;
    a plurality of movable sheave segments mounted in association with a track, each sheave segment including cam/bearing means and toothed means, said cam/bearing means having multiple camming surfaces associated with each said toothed means and independently movable radially relative to each said toothed means, said cam/bearing means engaged by said endless drive member when said drive mechanism is outside a predetermined arc of rotation, to rigidly bias said toothed means against said track; and means associated with each said sheave segment for resiliently biasing said toothed means into engagement with said track.

2. The mechanism as recited in claim 1 further comprising:
nubbin means associated with each said sheave segment; and
shift means for engaging said nubbin means and overcoming said resilient bias to cause movement of said sheave segment, said shift means positioned to engage said nubbin means outside said predetermined arc of rotation.

3. The mechanism as recited in claim 2 wherein said track includes at least two opposed toothed tracks and each said toothed means comprises at least a pair of toothed engagement blocks.

4. The mechanism as recited in claim 3 wherein said resilient bias means comprises springs acting between each said toothed engagement block and said cam/bearing means.

5. The mechanism as recited in claim 3 wherein said resilient bias means comprises compression spring means, said compression spring means mounted between each said toothed engagement block and said cam/bearing means to bias said toothed engagement blocks towards said tracks.

6. The mechanism as recited in claim 5, wherein each said toothed engagement blocks is provided with a plurality of follower surfaces, each adapted to be engaged by a camming surface of said cam/bearing means, each follower surface oriented, when engaged by a camming surface, to force its associated toothed engagement block into rigid engagement with a track.

7. The mechanism as defined in claim 6 wherein said cam/bearing means and toothed means have interlocking surfaces which prevent relative movement therebetween in a direction orthogonal to a major planar surface of said rotatably mounted drive mechanism.

8. The mechanism as defined in claim 7 wherein said cam/bearing means comprises a plurality of wedge cams.

9. The mechanism as defined in claim 8 wherein said toothed means are independent locking blocks, with each locking block provided with a partial nubbin, one said partial nubbin adapted to act against another said partial nubbin when engaged by said shift means.

10. Apparatus for repositioning a bearing surface relative to a track having tooth-like formations therein comprising:
block means of finite length having locked and unlocked conditions and tooth-like formations adapted to engage said tooth-like formations on said track when said block means is in the locked condition;
shift means for moving said block means to a new position relative to the track; and
bearing means associated with said bearing surface and provided with a plurality of camming surfaces which are engageable with and act along said finite length of said block means, said bearing means being movable relative to said block means to bias its tooth-like formations against said tooth-like formations on said track to create a locked condition.

11. The invention as defined in claim 10 further comprising:
belt means in association with said bearing surface for moving said bearing means to bias said block means into said locked condition.

12. The invention as defined in claim 10 further comprising:
spring bias means for maintaining said tooth-like formations on said block means in engagement with said tooth-like formations on said track.

13. The invention as defined in claim 10 further comprising:
means for moving said block means, bearing means and bearing surface out of contact with belt means, said shift means being positioned to move said block means only when said block means is out of contact with said belt means.

14. The invention as defined in claim 10 wherein said bearing means and block means have interlocking surfaces which prevent movement therebetween in a direction orthogonal to the operative direction of movement of said bearing means.

15. The invention as defined in claim 10, wherein said bearing surface is provided with a V shaped reception surface, the combination further comprising:
endless belt means, including a V shaped engagement surface positioned on said bearing surface, said V shaped engagement surface exhibiting a wider aspect ratio than said V shaped reception surface, whereby frictional engagement occur therebetween.

* * * * *